(12) United States Patent
Solomon et al.

(10) Patent No.: US 7,386,010 B2
(45) Date of Patent: Jun. 10, 2008

(54) MULTIPROTOCOL MEDIA CONVERSION

(75) Inventors: Ronen Solomon, Givatayim (IL); David Zelig, Givatayim (IL)

(73) Assignee: Corrigent Systems Ltd, Tel Aviv (IL)

( * ) Notice: Subject to any disclaimer, the term of this patent is extended or adjusted under 35 U.S.C. 154(b) by 941 days.

(21) Appl. No.: 10/461,807

(22) Filed: Jun. 13, 2003

(65) Prior Publication Data

US 2004/0252717 A1  Dec. 16, 2004

(51) Int. Cl.
- *H04J 3/16* (2006.01)
- *H04J 12/28* (2006.01)
- *G06F 15/173* (2006.01)

(52) U.S. Cl. ............ 370/466; 370/389; 370/401; 370/395.53; 709/224; 709/249

(58) Field of Classification Search ............ 370/395.6, 370/545, 389, 401, 395.53, 463–469; 709/218, 709/224, 230, 249
See application file for complete search history.

(56) References Cited

U.S. PATENT DOCUMENTS

| | | | |
|---|---|---|---|
| 6,222,855 B1 * | 4/2001 | Kimber et al. ............ 370/466 |
| 6,400,729 B1 * | 6/2002 | Shimadoi et al. ........... 370/466 |
| 6,611,867 B1 * | 8/2003 | Bowman-Amuah ......... 709/224 |
| 6,831,932 B1 | 12/2004 | Boyle et al. |
| 7,072,346 B2 * | 7/2006 | Hama .................... 370/395.53 |
| 7,126,952 B2 * | 10/2006 | Hooper et al. ............... 370/401 |
| 2001/0033575 A1 | 10/2001 | Shimamura et al. |
| 2002/0015411 A1 | 2/2002 | Kataoka et al. |
| 2002/0018482 A1 | 2/2002 | Gotzer |
| 2002/0093949 A1 | 7/2002 | Yasue et al. |
| 2002/0191250 A1 * | 12/2002 | Graves et al. ............... 359/128 |
| 2003/0026298 A1 | 2/2003 | Bisson et al. |
| 2003/0035439 A1 * | 2/2003 | Watanabe ................... 370/466 |
| 2004/0101303 A1 | 5/2004 | Williams |
| 2005/0135436 A1 | 6/2005 | Nigam et al. |

OTHER PUBLICATIONS

U.S. Appl. No. 09/978,342, filed Oct. 17, 2001, Zelig.
"Synchronous Optical Network, (SONET) Transport Systems: Common Generic Criteria," Telcordia Technologies, Piscataway, New Jersey, publication GR-253-CORE, Sep. 2000.
Martini, et al., in an IETF Draft Entitled: "Encapsulation Methods for transport of layer 2 Frames over MPLS," May 2001. (Available at: serach.ietf.org/internet-drafts/draft-martini-12circuit-encap-mpls-02.txt.).

(Continued)

*Primary Examiner*—Edan Orgad
*Assistant Examiner*—Venkatesh Haliyur
(74) *Attorney, Agent, or Firm*—Townsend and Townsend and Crew LLP (57) ABSTRACT

A method for data communications includes linking a plurality of edge devices to communicate with a remote network device via a network in accordance with a packet-oriented Layer 2 communication protocol. At each of the plurality of edge devices, incoming data frames are received from client nodes in accordance with respective native Layer 2 protocols, at least one of which is different from the packet-oriented Layer 2 communication protocol. The received incoming data frames are converted at each of the edge devices from at least a first format specified by the native Layer 2 protocols to a second format specified by the packet-oriented Layer 2 communication protocol. The incoming data frames are transmitted in the second format via the network to the hub.

27 Claims, 2 Drawing Sheets

OTHER PUBLICATIONS

Rosen, et al., in Request for Comments (RFC) 3031 of the Internet Engineering Task Force (IETF), entitled: "Multiprotocol Label Switching Architecture," Jan. 2001. (Available at: www.ietf.org/rfc.html).

Malis, et al., in an IETF draft entitled: "SONET/SDH Circuit Emulation Service Over MPLS (CEM) Encapsulation," Apr. 2001. (Available at: search.ietf.org/internet-drafts/draft-malis-sonet-ces-mpls-04.txt.).

Townsley, et al., "Layer Two Tunneling Protocol (Version 3) L2TPv3" (IETF draft-ietf-l2lpexl-l2pl-base-03.txt), Jun. 2002.

Martini, et al., "Encapsulation Methods for Transport of Layer 2 Frames over IP and MPLS Networks," (IETF draft-martini-ethernet-encap-mpls-01.txt), Jul. 2002.

Martini, et al., "Encapsulation Methods for Transport of Layer 2 Frames over MPLS," (IETF draft-martini-l2circuit-encap-mpls-04.txt), Nov. 2001.

Sajassi et al., "L2VPN Interworking" (draft-sajassi-l2vpn-interworking-01.txt, Mar. 2003).

Deering, RFC 1112, "Host Extensions for IP Multicasting," Aug. 1989.

Tricci so, et al., "Ethernet Pseudo Wire Emulation Edge-to-Edge (PWE3)", (draft-so-pwe3-ethernet.txt), Sep. 2002.

T. Sevevirathne, "Virtual Private LAN Service (VPLS) Solution Using GRE Based IP Tunnels," (draft-tsenevir-gre-vpls-00.txt), Feb. 2002.

Prayson Pate, et al., "Framework for Pseudo Wire Emulation Edge-to-Edge (PWE3)," (draft-ietf-pwe3-framework-01.txt), Jun. 2002.

Xipeng Xiao, et al., "Requirements for pseudo-wire emulation edge-to-edge (PWE3)" (draft0ietf-pwe3-requirements-03.txt), Jun. 2002.

W. Augustyn, et al., "Requirements for Virtual Private LAN Services" (draft-augustyn-spls-requirements-02.txt), Aug. 2002.

Marc Lasserre, et al., "Virtual Private LAN Services Over MPLS" (draft-lasserre-vkompella-ppvpn-vpls-01.txt), Sep. 2002.

ITU-T, Series I: Integrated Services Digital Network, ITU-T Recommendation 1.432.1, 1999.

Mamokos, et al. "A Method for Transmitting PPP Over Ethernet (PPPoE)," in IETF RFC 2516, Feb. 1999.

Simpson, in IETF RFC 16651, "The Point-to-Point Protocol (PPP)," Jul. 1994.

Reynolds, in IETF RFC 1700, "Assigned Numbers," Oct. 1994.

Christiansen, in IETF draft "MPLIS Multicast over Ethernet," (draft-jagd-mpls-mcast-eth-00.txt, 2001).

Baker, et al., in IETF RFC 1638, "PPP Bridging Control Protocol (BCP)," Jun. 1994.

Bradley, et al., in IETF RFC 1490, "Multiprotocol Interconnect over Frame Relay," Jul. 1993.

Martini, et al., Internet Draft, entitled: "Transport of Layer 2 Frames over MPLS," May 2001, (Available at: search.ietf.org/internet-drafts/draft-martini-l2circuit-mpls-06.txt.).

* cited by examiner

FIG. 1

MULTIPROTOCOL MEDIA CONVERSION

FIELD OF THE INVENTION

The present invention relates generally to data communication networks, and specifically to interworking between packet networks and data networks of other kinds.

BACKGROUND OF THE INVENTION

Various methods are known in the art for providing different types of Layer 2 network service over a common packet network infrastructure. (The term "Layer 2" as used herein refers to the second layer in the protocol stack defined by the well-known Open Systems Interface (OSI) model, also known as the logical link, data link, or media access control (MAC) layer.) For example, Malis et al. describe a protocol that can be used to transport Synchronous Optical Network (SONET) frames over a packet network in an Internet Engineering Task Force (IETF) draft entitled "SONET/SDH Circuit Emulation over Packet (CEP)" (draft-ietf-pwe3-sonet-00.txt, July, 2002), which is incorporated herein by reference. This document, along with other IETF documents cited hereinbelow, is available at the IETF Web site. Traffic based on other Layer 2 protocols, such as such as Frame Relay, Asynchronous Transfer Mode (ATM), Ethernet, Cisco High-level Data Link Control (HDLC) and the Point-to-Point Protocol (PPP), may be transported over a packet infrastructure in a similar manner.

Most recent work on Layer 2 transport over packet networks focuses on encapsulation and transport of Layer 2 frames via tunnels through an Internet Protocol (IP) or Multiprotocol Label Switching (MPLS) network. For example, Martini et al. describe how an "Ethernet Pseudowire (PW)" may be created and used to carry Ethernet frames over an IP or MPLS network in an IETF draft entitled "Encapsulation Methods for Transport of Ethernet Frames Over IP/MPLS Networks" (draft-ietf-pwe3-ethernet-encap-02.txt, February, 2003), which is incorporated herein by reference. This technique enables service providers to offer "emulated" Ethernet services over existing IP or MPLS networks. User nodes on different physical local area networks (LANs) can be joined together through PW connections to define a virtual private network (VPN), which appears to the users to be a single Ethernet LAN. Additional PW types, for creating other types of Layer 2 circuits over IP and MPLS networks, are described in other IETF drafts.

Other protocols have been defined for transporting one type of Layer 2 traffic over a connection through another type of Layer 2 network. For example, Mamakos et al. describe methods for providing PPP facilities over Ethernet in IETF Request for Comments (RFC) 2516, entitled, "A Method for Transmitting PPP Over Ethernet (PPPoE)" (February, 1999), which is incorporated herein by reference.

The methods described above are all directed to supporting like-to-like Layer 2 services, i.e., the service endpoints communicate with one another using the same protocol, even though the traffic between the endpoints may be carried over a network that uses a different protocol. In contrast to these methods, interworking of Layer 2 services enables endpoints using disparate protocols to communicate with one another over the same VPN. This idea is described generally by Sajassi et al., in an IETF draft entitled, "L2VPN Interworking" (draft-sajassi-l2vpn-interworking-01.txt, March, 2003), which is incorporated herein by reference.

SUMMARY OF THE INVENTION

In embodiments of the present invention, a Layer 2 network is configured to make connections between endpoints running heterogeneous Layer 2 protocols. The endpoints are connected to the Layer 2 network through network edge devices, which communicate with one another using a common packet-oriented Layer 2 communication protocol, such as Ethernet. Each of the edge devices has one or more native network interfaces, which communicate with the endpoints using the disparate native Layer 2 protocols for which the endpoints are configured, such as SONET, PPP, Cisco HDLC, Frame Relay or Ethernet, for example.

Each of the edge devices comprises a protocol converter, which performs multiprotocol media conversion (MMC) functions required for interworking between the native protocols of the endpoints and the common packet-oriented protocol of the network. The protocol converter terminates the native protocol of data frames received from the endpoints and encapsulates the frame payloads in new frames for transmission through the network. Similarly, the protocol converter terminates the frames that it receives from the network and inserts their payloads in frames of the appropriate protocol types for transmission to the endpoints. As a result, endpoints running different Layer 2 protocols can communicate with one another transparently. Furthermore, because the edge devices perform their interworking functions at the Layer 2 level, no routing operations are required in the network. Therefore, the network can accommodate substantially any Layer 3 protocol without significant modification to the edge devices.

In some embodiments of the present invention, the edge devices also convert signaling and control messages between the common protocol used within the network and the native protocols of the endpoints. Thus, for example, when an edge devices determines that an Ethernet port within the network has failed, the edge device may generate an appropriate error message, in accordance with the native protocol, to an endpoint that is communicating with the particular port. The message may enable the endpoint to redirect its traffic through a different interface, or at least to save bandwidth by stopping transmission until the failure is rectified.

There is therefore provided, in accordance with an embodiment of the present invention, apparatus for data communications, including:

a hub, including a plurality of ports, which are configured to receive and transmit data frames in accordance with a packet-oriented Layer 2 communication protocol; and a plurality of edge devices, each such edge device including:

at least one network port for communicating with the ports of the hub via a network in accordance with the packet-oriented Layer 2 communication protocol;

one or more native interfaces, for communicating with client nodes in accordance with respective native Layer 2 protocols, at least one of which is different from the packet-oriented Layer 2 communication protocol; and a protocol converter, which is adapted to convert the data frames received on the one or more native interfaces from at least a first format specified by the native Layer 2 protocols to a second format specified by the packet-oriented Layer 2 communication protocol, so as to transmit the data frames in the second format via the at least one network port, and to convert the data frames received on the at least one network port from the second format to at least the first format, so as to transmit the data frames in at least the first format via the one or more native interfaces.

In a disclosed embodiment, the packet-oriented Layer 2 communication protocol includes an Ethernet protocol, and the native Layer 2 protocols are selected from a group of protocols consisting of a Frame Relay protocol, an Asynchronous Transfer Mode (ATM) protocol, a High-level Data Link Control (HDLC) protocol, a Point-to-Point Protocol (PPP), a Synchronous Optical Network (SONET) protocol, and the Ethernet protocol. Typically, the at least one network port includes an Ethernet port, and the one or more native interfaces include at least one of a time domain multiplexed (TDM) interface and a serial interface.

In an aspect of the invention, the protocol converter is adapted to terminate the native Layer 2 protocols of the data frames received on the one or more native interfaces. Typically, the protocol converter is adapted to determine a destination media access control (MAC) address on the network of the data frames received from the client nodes, and to insert the destination MAC address in a header of the data frames in the second format for transmission over the network. In one embodiment, the protocol converter is adapted, responsively to the data frames received on the one or more native interfaces, to invoke an Address Resolution Protocol (ARP) in order to determine the destination MAC address on the network. In another embodiment, the protocol converter is adapted to read a Layer 3 source address and a source MAC address from one of the data frames received from the network through the at least one network port, and to associate the source MAC address with the Layer 3 source address so as to use the source MAC address as the destination MAC address for the data frames to be transmitted over the network. In still another embodiment, the protocol converter is adapted to determine that a given data frame in the first format is a broadcast frame, and to set the destination MAC address of the given data frame in the second format to a broadcast MAC address specified by the packet-oriented Layer 2 communication protocol.

In a further aspect of the invention, the data frames include a Layer 3 payload, and the protocol converter is adapted to determine a protocol type of the Layer 3 payload in the data frames received on the one or more native interfaces and to insert a value indicative of the determined protocol type in a type field in a header of the data frames to be transmitted in the second format. In one embodiment, the first format includes a Point-to-Point Protocol (PPP) format, and the second format includes an Ethernet format, whereby the type field is an Ethernet type field.

In another embodiment, the data frames in the second format include a checksum, and the protocol converter is adapted to determine, responsively to a header field in the data frames in the first format, whether the checksum in the data frames in the second format is valid for the second format.

In another aspect of the invention, the edge devices are adapted to direct the data frames received from two or more of the native interfaces to one of the ports of the hub, and to map the two or more of the native interfaces to different, respective Virtual Local Area Networks (VLANs) on the network. Typically, the protocol converter is adapted, in response to a control message received on one of the native interfaces indicative of a failure in communication with one or more of the client nodes, to deregister one of the VLANs that is associated with the one of the native interfaces.

Additionally or alternatively, the protocol converter is adapted to detect a failure associated with the at least one network port, and to generate, in response to the failure, a control message indicative of the failure for transmission to one or more of the client nodes in accordance with one of the native Layer 2 protocols.

There is also provided, in accordance with an embodiment of the present invention, a method for data communications, including:

linking a plurality of edge devices to communicate with a hub via a network in accordance with a packet-oriented Layer 2 communication protocol; and at each of the plurality of edge devices, receiving incoming data frames from client nodes in accordance with respective native Layer 2 protocols, at least one of which is different from the packet-oriented Layer 2 communication protocol;

converting the received incoming data frames at each of the edge devices from at least a first format specified by the native Layer 2 protocols to a second format specified by the packet-oriented Layer 2 communication protocol; and transmitting the incoming data frames in the second format via the network to the hub.

The present invention will be more fully understood from the following detailed description of the embodiments thereof, taken together with the drawings in which:

DETAILED DESCRIPTION OF EMBODIMENTS

Figure 1:
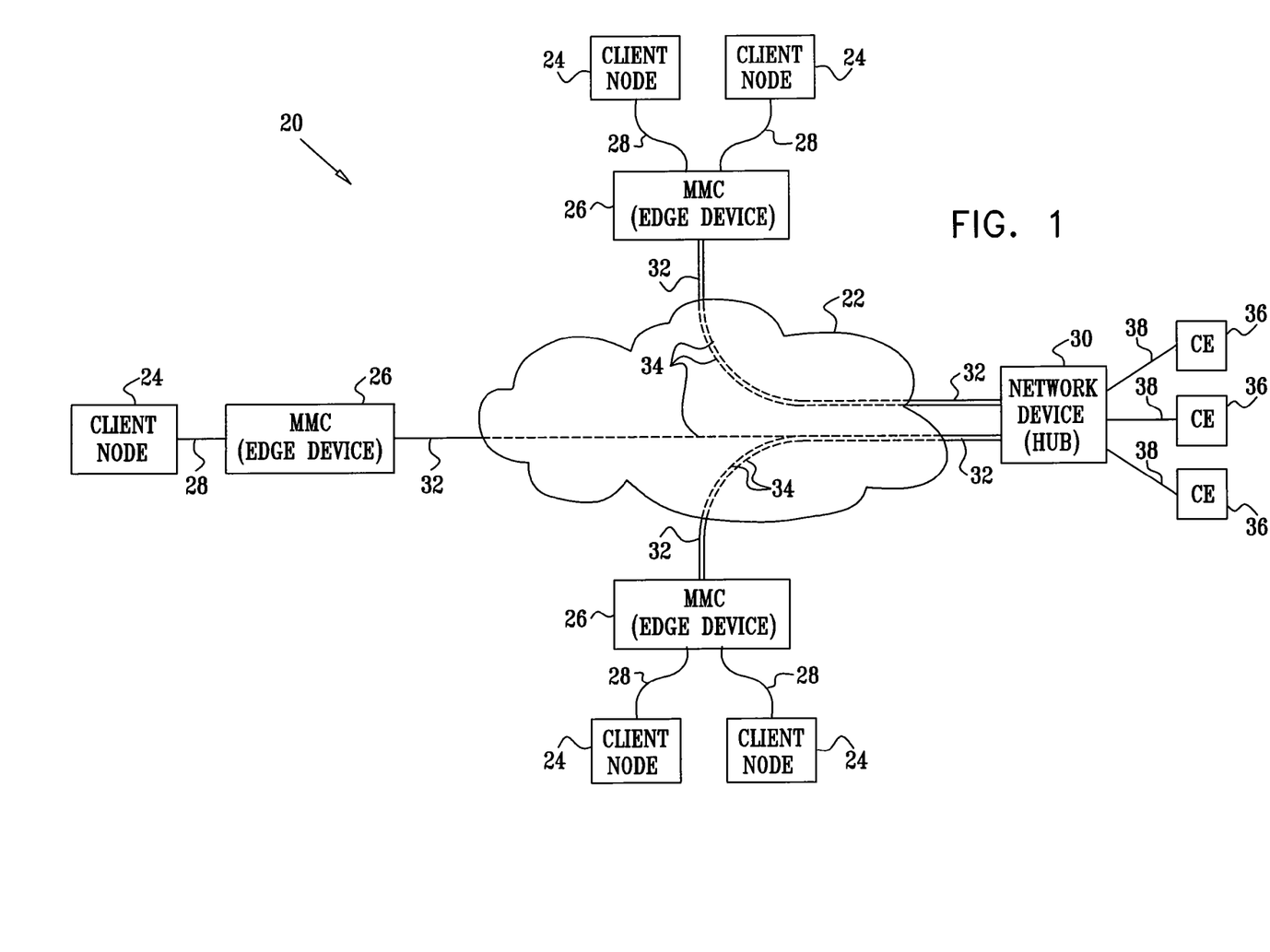
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 enables multiple endpoints, such as client nodes 24, running heterogeneous Layer 2 protocols, to communicate over a common Layer 2 network 22. System 20 may operate, for example, as a Layer 2 virtual private network (VPN), serving clients in multiple different locations and facilities of an enterprise. Network 22 is typically an Ethernet network, which may comprise either conventional, physical Ethernet links or PW Ethernet connections, as described in the above-mentioned draft by Martini et al. Alternatively, the principles of the present invention may be implemented, mutatis mutandis, over Layer 2 networks of other types.

Client nodes 24 communicate with network 22 via edge devices 26. The edge devices are connected to client nodes 24 via attachment circuits 28, typically comprising Layer 2 communication links, which may be of different types, including both packet links, synchronous Time Domain Multiplexed (TDM) links, such as SONET links, and serial links, such as V.35, RS232 or High-Speed Serial Interface (HSSI) links. The client nodes typically communicate with the edge devices over circuits 28 using different native protocols, such as SONET, Frame Relay, ATM, Ethernet, Cisco HDLC and PPP. Edge devices 26 perform multiprotocol media conversion (MMC) functions, to interwork between the native protocols of circuits 28 and the Ethernet protocol used in network 22.

Edge devices 26 are typically connected via Ethernet ports 32 and Ethernet links 34 through network 22 to an Ethernet network device 30 with a hub interface. As noted above, ports 32 and links 34 may comprise physical ports and physical links, or virtual PW ports and PW connections, or a combination of both. In any case, communications over network 22 are packet-oriented and therefore benefit from the bandwidth savings inherent in statistically-multiplexed packet networks, even when client nodes 24 communicate with the network on circuits 28 over synchronous links. Device 30 may be further connected to Ethernet customer edge (CE) devices 36 over Ethernet links 38 (physical or PW) or to an Ethernet-based core network (not shown). Typically, each circuit 28 served by one of edge devices 26 is mapped to a different port 32 or to a different Virtual Local Area Network (VLAN) on device 30. This mapping enables device 30 (as well as Layer 3 routing equipment connected to the device) to serve each client node 24 as though it were physically connected to one of the hub ports. As a result, client nodes 24 are able to communicate transparently with CE devices 36 and with the other client nodes as though they were directly connected through a conventional Layer 2 link, operating in accordance with the native protocol of the client node.

Figure 2:
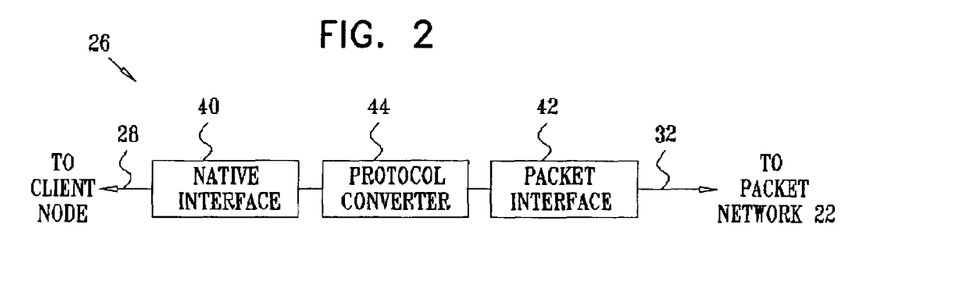
FIG. 2 is a block diagram that schematically shows details of an edge device in a communication network, in accordance with an embodiment of the present invention.

FIG. 2 is a block diagram that schematically shows details of edge device 26, in accordance with an embodiment of the present invention. A native interface 40 couples to attachment circuit 28, in accordance with the requirements of the native network type and protocols. For example, interface 40 may comprise a TDM interface, such as a SONET OC-3 interface, or a serial interface, such as a V.35, RS232 or HSSI-type interface. A packet interface 42, typically an Ethernet interface, couples to network 22. Although only a single native interface 40 and packet interface 42 are shown in FIG. 2, device 26 may alternatively support multiple native interfaces and/or multiple packet interfaces, as shown in FIG. 1.

A protocol converter 44 is responsible for the MMC functions of device 26, which include:

Converting Layer 2 frames received by native interface 40 using the native protocol of circuit 28 to Ethernet frames for transmission over network 22.

Converting Ethernet frames received by packet interface 42 to Layer 2 frames in accordance with the native protocol of circuit 28.

Multicast and broadcast packet mapping on the Ethernet network.

Remote defect indication: signaling to the client interfaces on circuit 28 when a failure has occurred on network 22, and vice versa.

Supporting address learning procedures specified by Ethernet and the native Layer 2 protocols.

Other control and signaling functions specified by the native Layer 2 protocols.

These functions are described in further detail hereinbelow.

Protocol converter 44 typically comprises a general-purpose or embedded microprocessor, which is programmed in software to perform the functions described herein. Alternatively, some or all of the functions of the protocol converter may be carried out by custom, semi-custom or programmable hardware logic circuits, such as gate arrays. For the sake of simplicity, the elements of edge device 26 are shown only schematically here. Implementation of these elements is within the capabilities of a person of ordinary skill in the art, based on the description given herein.

Figure 3:
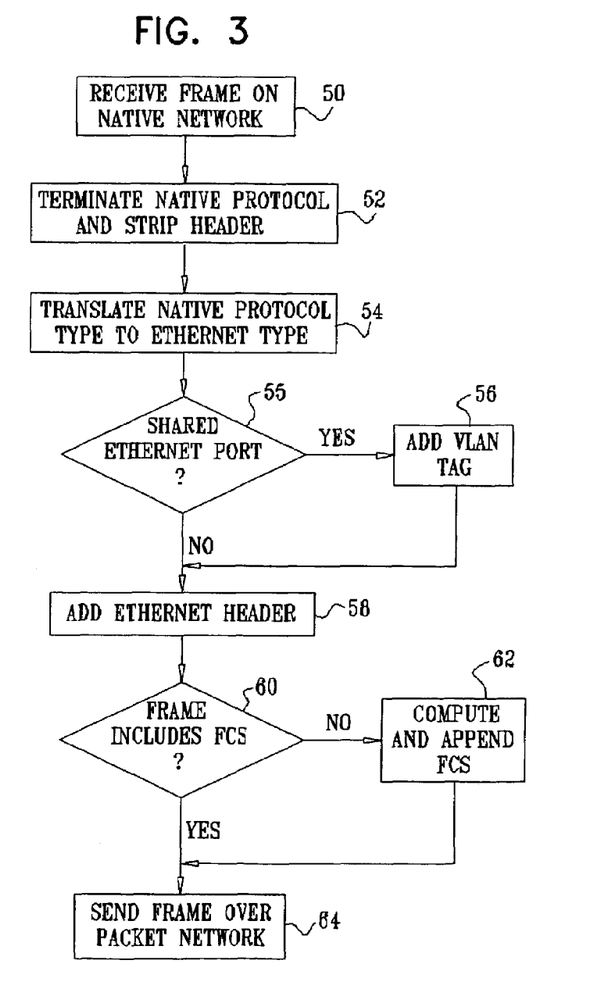
FIG. 3 is a flow chart that schematically illustrates a method for multiprotocol media conversion, in accordance with an embodiment of the present invention.

FIG. 3 is a flow chart that schematically illustrates a method for converting Layer 2 frames received by native interface 40 to Ethernet frames for transmission over network 22, in accordance with an embodiment of the present invention. This method will be described first by way of example with reference to conversion of PPP frames to Ethernet frames. Examples of some other Layer 2 frame types are described subsequently. To convert Ethernet frames to other types of Layer 2 frames, the processes described below are simply reversed.

The method of FIG. 3 is initiated when device 26 receives a Layer 2 frame on native interface 40, at a frame reception step 50. In the case of PPP, the frame will have the following form, as specified by Simpson in IETF RFC 1661, entitled "The Point-to-Point Protocol (PPP)" (July, 1994), which is incorporated herein by reference:

TABLE I

| PPP FRAME FORMAT |
|---|
| Address = 0xFF |
| Control = 0x03 |
| PPP Protocol Type |
| Layer 3 Payload |
| FCS |

Protocol converter 44 terminates the PPP frame, and strips the header fields from the Layer 3 payload, at a protocol termination step 52. The "protocol type" field identifies the Layer 3 payload and indicates to converter 44 how the payload should be handled. For example, a value of the protocol type field starting with 0xC identifies a link control protocol (LCP) frame, while a value starting with 0x8 identifies a network control protocol (NCP) frame, as specified by RFC 1661. Converter 44 handles these control frames differently from data frames, as described below. On the other hand, protocol type values starting with 0x0 identify the particular Layer 3 (network layer) protocol of the payload, as specified in IETF RFC 1700, by Reynolds and Postel, entitled "Assigned Numbers" (October, 1994), which is incorporated herein by reference.

For PPP data frames, protocol converter 44 translates the PPP protocol type value to the corresponding Ethernet type value, at a type translation step 54. For this purpose, converter 44 may store and use a look-up table, which may be updated from time to time using a suitable network management protocol. An exemplary translation table is shown below:

TABLE II

| PPP TO ETHERNET PROTOCOL TYPE TRANSLATION | | |
|---|---|---|
| Protocol name | PPP Protocol Type | Ethernet Type |
| Apple Talk | 0x0029 | 0x809B |
| DECnet Phase IV | 0x0027 | 0x6003 |
| IPX | 0x002B | 0x8137 |
| IPV4 | 0x0021 | 0x0800 |
| IPV6 | 0x0057 | 0x86DD |
| Banyan VINES | 0x0035 | 0x80C4 |
| MPLS unicast | 0x0281 | 0x8847 |
| MPLS multicast | 0x0283 | 0x8848 |

(Note that in some PPP variants, the protocol type is reduced to a single byte, but the same principles of protocol type translation will apply.)

In order to construct the appropriate Ethernet header for the Layer 3 payload, protocol converter 44 must first determine whether native interface 40 is associated uniquely with a dedicated Ethernet port 32 on device 30 (FIG. 1), or whether the Ethernet port is shared with other native interfaces, at a sharing determination step 55. Typically, converter 44 is pre-configured with this information. If the Ethernet port is shared, converter 44 looks up and adds the appropriate VLAN tag for this interface, at a tagging step 56.

Protocol converter 44 now adds an Ethernet header to the Layer 3 payload, at an Ethernet encapsulation step 58. The form of the Ethernet frames resulting at this point is shown below in Table III (no VLAN tag) and Table IV (with VLAN tag):

TABLE III

ETHERNET ENCAPSULATION, NO VLAN

Destination MAC address
Source MAC address
Ethernet Type (from Table II)
Layer 3 payload
FCS

TABLE IV

ETHERNET ENCAPSULATION WITH VLAN

Destination MAC address
Source MAC address
Ethernet Type = 0x8100
VLAN Tag
Ethernet Type (from Table II)
Layer 3 payload
FCS Converter 44 inserts in the Ethernet header a destination MAC address corresponding to the frame destination, such as the MAC address of one of Ethernet CE devices 36, and a source MAC address representing either the client device 24 that sent the frame or edge device 26 itself. For Ethernet-type MPLS multicast, converter typically appends an destination MAC address using the addressing method suggested by Christensen in an IETF draft entitled "MPLS Multicast over Ethernet" (draft-jagd-mpls-mcast-eth-00.txt, 2001), which is incorporated herein by reference. The address assignment may be pre-configured in a table held by converter 44, or it may, alternatively or additionally, be performed dynamically, using methods of address discovery described below. Converter 44 may also be configured to support IP multicast and broadcast at the Ethernet level. These functions are described below, as well.

In some cases, when PPP is used to bridge between Ethernet LANs, the PPP frame payload may already contain a complete Ethernet frame, including the Ethernet frame checksum (FCS). PPP bridging is described in by Baker et al., in IETF RFC 1638, entitled "PPP Bridging Control Protocol (BCP)" (June, 1994), which is incorporated herein by reference. The form of an exemplary PPP bridging frame is shown in the following table:

TABLE V

PPP BRIDGING FRAME

Address = 0xFF
Control = 0x03
PPP Protocol Type = 0x0031

TABLE V-continued

PPP BRIDGING FRAME

| F | I | Z | Pad | MAC Type |
|---|---|---|-----|----------|
|   |   | LAN ID (high word) | | |
|   |   | LAN ID (low word) | | |
|   | Pad | | Frame control | |
|   |   | Destination MAC address | | |
|   |   | Source MAC address | | |
|   |   | Ethernet Type (from Table II) | | |
|   |   | Layer 3 payload | | |
|   |   | FCS | | |

Converter 44 determines whether the current frame is a bridging frame and, if so, whether it includes a valid Ethernet FCS, at a bridge frame checking step 60. If the frame does include a valid FCS, the F bit in the PPP header will be set, indicating to converter 44 that there is no need to recompute the FCS. When the F bit is not set (and for ordinary PPP frames, which do not encapsulate an Ethernet frame), converter 44 computes the Ethernet FCS, at a checksum computation step 62. Otherwise, the encapsulated Ethernet frame in the PPP payload can be sent as is, except for addition of a VLAN tag if needed.

After completing the Ethernet header and checksum computation, as required, converter 44 dispatches the Ethernet frame via packet interface 42 to its destination over network 22, at a frame transmission step 64.

Returning to the case of the PPP bridging frame, as shown in Table V, converter 44 may check other fields in the PPP header to ensure that it handles the frame properly. For example, if the MAC Type field does not match the (Ethernet) MAC type of network 22, converter 44 should typically discard the frame. For outgoing Ethernet frames received by device 26 on interface 42 from network 22, converter 44 typically determines the type of PPP encapsulation (bridging or ordinary Layer 3 encapsulation, as shown in Table I) depending on the port or VLAN on which the frames were received, based on a pre-configured look-up table. If PPP bridging is indicated, converter 44 adds the required PPP header fields, as shown in Table V, to the Ethernet frame. The I bit may be set to zero, since no LAN ID is required. The MAC type is set to the appropriate Ethernet type for network 22. Settings of the other header fields will be apparent to those skilled in the art.

Other native protocol types on attachment circuits 28 are handled in similar fashion to PPP. For example, Cisco HDLC unicast frames (as used in network products made by Cisco Systems, San Jose, Calif.) have the following form:

TABLE VI

CISCO HDLC UNICAST FRAME FORMAT

Address = 0x0F
Control = 0x00
Ethernet Type
Layer 3 Payload
FCS

Converter 44 strips the Cisco HDLC frame header from the Layer 3 payload at step 52, and adds an Ethernet header at step 58, including a VLAN tag if required. In this case, there is no need for translation from the native protocol type to the Ethernet type, since Cisco HDLC uses the same protocol type coding as Ethernet.

For broadcast packets, including ARP, CDP and inverse ARP packets, Cisco HDLC uses the same format as shown in Table VI above, except that the address is set to 0x8F. Therefore, when converter 44 receives a frame with address=0x8F, it sets the destination MAC address of the corresponding Ethernet frame to the broadcast address FF-FF-FF-FF-FF-FF. Similarly, when converter 44 receives an Ethernet frame from network 22 with destination MAC address FF-FF-FF-FF-FF-FF, it sets the address field of the corresponding Cisco HDLC frame to 0x8F.

Frame Relay frames typically have the following format, as specified by Bradley et al., in IETF RFC 1490, entitled "Multiprotocol Interconnect over Frame Relay" (July, 1993), which is incorporated herein by reference:

TABLE VII

FRAME RELAY FRAME FORMAT

Q.922 address
Control = 0x03
NLPID
Layer 3 Payload
FCS

To convert the Frame Relay frame to an Ethernet frame, converter 44 translates the Network Level Protocol ID (NLPID) field into the corresponding Ethernet type using a translation table, similar to that shown in Table II. For example, for IPv4, NPLID=0xCC, while for IPv6 NPLID=0x8E. For each Frame Relay Data Link Connection Identifier (DLCI), which is identified by its Q.922 address, converter 44 adds a unique VLAN tag to the Ethernet header. The mapping between VLAN tags and Q.922 addresses is typically specified in a configuration table held by the converter. When converter 44 converts outgoing Ethernet frames into Frame Relay frames, it uses the same type and address correspondences as in the incoming direction, and in addition sets the Frame Relay flag bits FECN, BECN and DE (as specified in the RFC) to zero.

An alternative Frame Relay format is shown in Table VIII below:

TABLE VIII

FRAME RELAY FRAME FORMAT WITH ETHERTYPE

Q.922 address
Control = 0x03
PAD 0x00
NLPID 0x80
OUI = 0x00-00-00
Ethertype
Layer 3 Payload
FCS In this case, the Frame Relay header uses the same Ethernet type as the Ethernet header. Therefore, no type translation is required. In other respects, the Frame Relay/Ethernet conversion proceeds as described above.

Frame Relay may also be used to bridge between Ethernet LANs, in similar fashion to the PPP bridging functionality described above. In this case, the Frame Relay frame has the form shown in the next table:

TABLE IX

FRAME RELAY BRIDGING FRAME

Q.922 address
Control = 0x03
PAD 0x00
NLPID = 0x80
OUI = 0x00-80-C2
PID
Ethernet frame
FCS Converter 44 simply strips away the Frame Relay header from the encapsulated Ethernet frame. The Protocol Identifier (PID) indicates whether the encapsulated Ethernet frame includes a valid FCS. If PID=0x0001, a valid FCS is present in the encapsulated frame, and converter 44 therefore skips step 60 (FIG. 3). Otherwise, if PID=0x0007, converter 44 calculates the FCS at step 62, and adds it at the end of the frame. In other respects, the frame protocol conversion takes place as described above. For each DLCI, converter 44 maintains an individual configuration, indicating whether the DLCI (and the corresponding VLAN) uses bridged encapsulation (Table IX) or Layer 3 encapsulation (Table VIII), and processes the Frame Relay and Ethernet frames accordingly.

As noted above, in order to find the required Ethernet destination MAC address at step 58 (FIG. 3), converter 44 in edge device 26 may use either static address assignments held in a table, or it may use methods of address discovery to find addresses dynamically. converter 44 may perform dynamic address discovery is by emulating the well-known Address Resolution Protocol (ARP). For this purpose, converter 44 is pre-configured with the IP addresses of client node 24 and of destination devices, such as CE devices 36 (assuming the CE devices support IP), and with the identity of the remote peer for each IP address. To determine the MAC address of CE device 36, converter 44 sends an ARP request packet through interface 42 to the IP address of the CE devices. The CE device replies with an ARP response, giving its MAC address. Similarly, when CE device 36 sends an ARP request to the IP address of client node 24, converter 44 receives the request and replies with its own Ethernet MAC address or a MAC address assigned to represent the client node. Edge devices 26 may similarly be configured to handle Inverse ARP messages.

As another alternative, converter 44 may discover Ethernet MAC addresses without resorting to ARP. In this case, it is again assumed that converter 44 is pre-configured with the IP addresses of client node 24 and of a destination device, such as CE device 36, and with the identity of the remote peer for each IP address. Converter 44 reads the IP source address in the header section of the Layer 3 payload of Ethernet frames that it receives from network 22. If the IP source address matches the pre-configured address of one of the CE devices, converter 44 can now associate the source MAC address of the frame with the IP source address. The converter can subsequently use this MAC address as the destination MAC address for frames that it receives from client node 24 with the IP destination address of CE device 36. Signaling packets transmitted on network 22, such as OSPF, RIP, Cisco Discovery Protocol (CDP), or ping packets, may be used in this sort of address discovery.

As still a further alternative, as long as the destination CE device 36 is connected directly to device 30 (and not through a Layer 2 bridged network), converter 44 may append a broadcast destination MAC address, such as FF-FF-FF-FF-FF-FF. Since the links between client node 24 and CE devices 36 are point-to-point links, device 30 will "broadcast" the Ethernet frame only to the destination CE device. Otherwise, if there is a Layer 2 bridged network between Ethernet device 30 and CE device 36, the frame will be received by all CE devices on the bridged network.

To identify IP multicast and broadcast packets in the Layer 3 payload of incoming data frames from client node 24, converter 44 also reads the header section of the Layer 3 payload. If the Layer 3 packet is found to carry an IP multicast or broadcast address, the converter assigns the appropriate Ethernet multicast MAC address or broadcast MAC address from its addressing table. Typically, to handle broadcast packets, converter 44 is pre-configured with the IP address and subnet mask, so as to be able to identify the broadcast range. In this case, converter 44 sends the packet to the entire subnet, as is known in the art, with the MAC address set to be all ones, in accordance with Ethernet convention. Alternatively, converter 44 may handle the IP broadcast as a Layer 2 unicast, since the links between client node 24 and destination devices, such as CE devices 36, are point-to-point links, as noted above. Multicast packets can be identified and distributed easily, based on their IP addresses in the well-known multicast range, from 224.0.0.0 through 239.255.255.255.

In the embodiments described above, each native attachment circuit 28 handled by edge device 26 is mapped uniquely to an Ethernet port 32 on device 30 or to an Ethernet VLAN. This mapping enables converter 44 to associate each failure that it may detect on a given Ethernet port or VLAN with a particular attachment circuit, and similarly to associate a failure on a given attachment circuit with a particular Ethernet port or VLAN. Preferably, when converter 44 detects such a failure via either native interface 40 or packet interface 42, it signals the other interface to stop transmission of data that will not reach its destination because of the failure. This sort of signaling and control is useful in conserving bandwidth, by preventing transmission to failed links. Furthermore, if client node 24 is equipped with a redundant link to network 22 (through a different edge device or port), the client node may, upon receiving the failure signal from edge device 26, maintain communications by switching over to the redundant link. Thus, system 20 can provide multi-hop failure protection, which is not a characteristic feature of Layer 2 networks known in the art.

When a failure occurs on the Ethernet side of edge device 26, converter 44 sends out a signaling message via native interface 40 to report the failure to client nodes 24 that are connected to the native interface. The failure on the Ethernet side may be detected, for instance, when the operational status of the corresponding Ethernet link 34 is down or when an auto-negotiation process on the link fails. Additionally or alternatively, failures detected by device 36 (on links 38, for example) may be reported to edge device 26 using signaling protocols known in the art, such as LDP or RSVP-TE. Converter 44 then sends the signaling message over native interface 40 using the appropriate control protocol for circuit 28. For example, for a PPP link, converter 44 may send a TERMINATE-REQUEST message in accordance with the PPP Link Control Protocol (LCP); for Cisco HDLC, converter 44 may stop interface 40 from sending KEEP ALIVE signals, as specified by the HDLC Serial Link Address Resolution Protocol (SLARP); and for Frame Relay, converter 44 may set the A bit to notActive in the Local Management Interface (LMI) frames that it sends over circuit 28. Alternatively or additionally, converter 44 may simply drop all incoming frames from circuit 28 until the failure on the Ethernet side has been resolved.

Since Ethernet has no control protocol of this sort, converter 44 cannot directly signal Ethernet device 30 when failures occur on the native interface side. (Note, however, that control protocols for use in Ethernet networks are in development and, when available, may be used for signaling between converter 44 and device 30.) When the connection to client node 24 via native interface 40 is mapped to a particular VLAN, however, converter 44 may deregister the VLAN when it detects a failure on the client node connection. VLAN registration protocols known in the art, such as the GARP VLAN Registration Protocol (GVRP) or the VLAN Trunk Protocol (VTP), may be used for this purpose. Additionally or alternatively, converter 44 may drop outgoing Ethernet frames that it receives on the VLAN in question. Further alternatively, if a signaling facility is provided between converter 44 and Ethernet device 30, and no VLAN multiplexing is used on a given port 32 of Ethernet device 30 that is connected to edge device 26 reporting the fault, the Ethernet device 30 may simply drop all frames that it receives from CE devices 36 for transmission through this port.

Although the embodiments described above relate specifically to conversions between certain particular Layer 2 protocols and to the exemplary network topology of system 20, as shown in FIG. 1, the principles of the present invention may similarly be applied to conversion of other protocol types, and to other network topologies, as well. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for data communications, comprising:
   a hub, comprising a plurality of ports, which are configured to receive and transmit data frames in accordance with a packet-oriented Layer 2 communication protocol; and
   a plurality of edge devices, each such edge device comprising:
   at least one network port for communicating with the ports of the hub via a network in accordance with the packet-oriented Layer 2 communication protocol;
   one or more native interfaces, for communicating with client nodes in accordance with respective native Layer 2 protocols, at least one of which is different from the packet-oriented Layer 2 communication protocol; and
   a protocol converter, which is configured to convert the data frames received on the one or more native interfaces from at least a first format specified by the native Layer 2 protocols to a second format specified by the packet-oriented Layer 2 communication protocol, so as to transmit the data frames in the second format via the at least one network port, and to convert the data frames received on the at least one network port from the second format to at least the first format, so as to transmit the data frames in at least the first format via the one or more native interfaces,
   such that the edge devices are configured to direct the data frames received from two or more of the native interfaces to one of the ports of the hub, and to map the two or more of the native interfaces to different, respective Virtual Local Area Networks (VLANs) on the network, such that the at least one network port comprises an Ethernet port, and such that the one or more native interfaces comprise at least one of a time domain multiplexed (TDM) interface and a serial interface.

2. The apparatus according to claim 1, such that the packet-oriented Layer 2 communication protocol comprises an Ethernet protocol.

3. The apparatus according to claim 2, such that the native Layer 2 protocols are selected from a group of protocols consisting of a Frame Relay protocol, an Asynchronous Transfer Mode (ATM) protocol, a High-level Data Link Control (HDLC) protocol, a Point-to-Point Protocol (PPP), a Synchronous Optical Network (SONET) protocol, and the Ethernet protocol.

4. The apparatus according to claim 1, such that the protocol converter is configured to terminate the native Layer 2 protocols of the data frames received on the one or more native interfaces.

5. The apparatus according to claim 4, such that the protocol converter is configured to determine a destination media access control (MAC) address on the network of the data frames received from the client nodes, and to insert the destination MAC address in a header of the data frames in the second format for transmission over the network.

6. The apparatus according to claim 5, such that the protocol converter is configured, responsively to the data frames received on the one or more native interfaces, to invoke an Address Resolution Protocol (ARP) in order to determine the destination MAC address on the network.

7. The apparatus according to claim 5, such that the protocol converter is configured to read a Layer 3 source address and a source MAC address from one of the data frames received from the network through the at least one network port, and to associate the source MAC address with the Layer 3 source address so as to use the source MAC address as the destination MAC address for the data frames to be transmitted over the network.

8. Apparatus for data communications, comprising:
a hub, comprising a plurality of ports, which are configured to receive and transmit data frames in accordance with a packet-oriented Layer 2 communication protocol; and
a plurality of edge devices, each such edge device comprising:
at least one network port for communicating with the ports of the hub via a network in accordance with the packet-oriented Layer 2 communication protocol;
one or more native interfaces, for communicating with client nodes in accordance with respective native Layer 2 protocols, at least one of which is different from the packet-oriented Layer 2 communication protocol; and
a protocol converter, which is configured to convert the data frames received on the one or more native interfaces from at least a first format specified by the native Layer 2 protocols to a second format specified by the packet-oriented Layer 2 communication protocol, so as to transmit the data frames in the second format via the at least one network port, and to convert the data frames received on the at least one network port from the second format to at least the first format, so as to transmit the data frames in at least the first format via the one or more native interfaces, such that the protocol converter is configured to terminate the native Layer 2 protocols of the data frames received on the one or more native interfaces and to determine a destination media access control (MAC) address on the network of the data frames received from the client nodes, and to insert the destination MAC address in a header of the data frames in the second format for transmission over the network, and such that the protocol converter is configured to determine that a given data frame in the first format is a broadcast frame, and to set the destination MAC address of the given data frame in the second format to a broadcast MAC address specified by the packet-oriented Layer 2 communication protocol.

9. The apparatus according to claim 1, such that the data frames comprise a Layer 3 payload, and such that the protocol converter is configured to determine a protocol type of the Layer 3 payload in the data frames received on the one or more native interfaces and to insert a value indicative of the determined protocol type in a type field in a header of the data frames to be transmitted in the second format.

10. The apparatus according to claim 9, such that the first format comprises a Point-to-Point Protocol (PPP) format, and such that the second format comprises an Ethernet format, whereby the type field is an Ethernet type field.

11. The apparatus according to claim 1, such that the data frames in the second format comprise a checksum, and such that the protocol converter is configured to determine, responsively to a header field in the data frames in the first format, whether the checksum in the data frames in the second format is valid for the second format.

12. The apparatus according to claim 1, such that the protocol converter is configured, in response to a control message received on one of the native interfaces indicative of a failure in communication with one or more of the client nodes, to deregister one of the VLANs that is associated with the one of the native interfaces.

13. The apparatus according to claim 1, such that the protocol converter is configured to detect a failure associated with the at least one network port, and to generate, in response to the failure, a control message indicative of the failure for transmission to one or more of the client nodes in accordance with one of the native Layer 2 protocols.

14. A method for data communications, comprising:
linking a plurality of edge devices to communicate with a hub via a network in accordance with a packet-oriented Layer 2 communication protocol;
at each of the plurality of edge devices, receiving incoming data frames from client nodes in accordance with respective native Layer 2 protocols, at least one of which is different from the packet-oriented Layer 2 communication protocol;
converting the received incoming data frames at each of the edge devices from at least a first format specified by the native Layer 2 protocols to a second format specified by the packet-oriented Layer 2 communication protocol; and
transmitting the incoming data frames in the second format via the network to the hub,
such that transmitting the incoming data frames comprises transmitting the incoming data frames received from two or more of the client nodes to one of the ports of the hub, and such that converting the received incoming data frames comprises associating the two or more of the client nodes with different, respective Virtual Local Area Networks (VLANs) on the network, such that receiving the incomingdata frames comprises receiving the incoming frames through at least one of a time domain multiplexed (TDM) interface and a serial interface, and such that transmitting the incoming data frames comprises transmitting the incoming data frames through an Ethernet port.

15. The method according to claim 14, and comprising:
transmitting outgoing data frames in the second format from the hub to the plurality of edge devices in accordance with the packet-oriented Layer 2 protocol;
converting the outgoing data frames at each of the edge devices from the second format to at least the first format; and
transmitting the data frames in at least the first format to the client nodes in accordance with the respective native Layer 2 protocols.

16. The method according to claim 14, such that the packet-oriented Layer 2 communication protocol comprises an Ethernet protocol.

17. The method according to claim 16, such that the native Layer 2 protocols are selected from a group of protocols consisting of a Frame Relay protocol, an Asynchronous Transfer Mode (ATM) protocol, a High-level Data Link Control (HDLC) protocol, a Point-to-Point Protocol (PPP), a Synchronous Optical Network (SONET) protocol, and the Ethernet protocol.

18. The method according to claim 14, such that converting the received incoming data frames comprises terminating the native Layer 2 protocols of the incoming data frames.

19. The method according to claim 18, such that converting the received incoming data frames comprises determining a destination media access control (MAC) address on the network for the incoming data frames, and inserting the destination MAC address in a header of the data frames in the second format for transmission over the network.

20. The method according to claim 19, such that determining the destination MAC address comprises invoking, responsively to the receiving incoming data frames, an Address Resolution Protocol (ARP) in order to determine the destination MAC address on the network.

21. The method according to claim 19, such that determining the destination MAC address comprises:
receiving a further data frame over the network in accordance with the packet-oriented Layer 2 communication protocol;
reading a Layer 3 source address and a source MAC address from the further data frame; and
associating the source MAC address with the Layer 3 source address so as to use the source MAC address as the destination MAC address for the incoming data frames to be transmitted over the network.

22. A method for data communications, comprising:
linking a plurality of edge devices to communicate with a hub via a network in accordance with a packet-oriented Layer 2 communication protocol;
at each of the plurality of edge devices, receiving incoming data frames from client nodes in accordance with respective native Layer 2 protocols, at least one of which is different from the packet-oriented Layer 2 communication protocol;
converting the received incoming data frames at each of the edge devices from at least a first format specified by the native Layer 2 protocols to a second format specified by the packet-oriented Layer 2 communication protocol; and
transmit ting the incoming data frames in the second format via the network to the hub,
such that converting the received incoming data frames comprises terminating the native Layer 2 protocols of the incoming data frames, and determining a destination media access control (MAC) address on the network for the incoming data frames, and inserting the destination MAC address in a header of the data frames in the second format for transmission over the network, and
such that determining the destination MAC address comprises determining that a given data frame in the first format is a broadcast frame, and setting the destination MAC address of the given data frame in the second format to a broadcast MAC address specified by the packet-oriented Layer 2 communication protocol.

23. The method according to claim 14, such that the data frames comprise a Layer 3 payload, and such that converting the received incoming data frames comprises determining a protocol type of the Layer 3 payload in the received incoming data frames, and inserting a value indicative of the determined protocol type in a type field in a header of the data frames to be transmitted in the second format.

24. The method according to claim 23, such that the first format comprises a Point-to-Point Protocol (PPP) format, and such that the second format comprises an Ethernet format, whereby the type field is an Ethernet type field.

25. The method according to claim 14, such that the data frames in the second format comprise a checksum, and such that converting the received incoming data frames comprises determining, responsively to a header field in the data frames in the first format, whether the checksum in the data frames in the second format is valid for the second format.

26. The method according to claim 14, and comprising, in response to a control message received on one of the native interfaces indicative of a failure in communication with one or more of the client nodes, deregistering one of the VLANs that is associated with the one of the native interfaces.

27. The method according to claim 14, and comprising detecting at one of the edge devices a failure on the network, and generating at the one of the edge devices, in response to the failure, a control message indicative of the failure for transmission to one or more of the client nodes in accordance with one of the native Layer 2 protocols.

* * * * *